United States Patent
Sworen et al.

(10) Patent No.: US 9,938,431 B2
(45) Date of Patent: *Apr. 10, 2018

(54) USE OF NON-FLUORINATED OR PARTIALLY FLUORINATED URETHANES IN COATINGS

(71) Applicant: THE CHEMOURS COMPANY FC LLC, Wilmington, DE (US)

(72) Inventors: John Christopher Sworen, Chadds Ford, PA (US); Gerald Oronde Brown, Wilmington, DE (US); Tatsiana Haidzinskaya, Newark, DE (US); Ewa Kohler, West Chester, PA (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 10 days.

This patent is subject to a terminal disclaimer.

(21) Appl. No.: 14/863,916

(22) Filed: Sep. 24, 2015

(65) Prior Publication Data

US 2016/0090509 A1    Mar. 31, 2016

Related U.S. Application Data

(60) Provisional application No. 62/055,965, filed on Sep. 26, 2014.

(51) Int. Cl.
| | | |
|---|---|---|
| C08G 18/32 | (2006.01) | |
| C08G 18/78 | (2006.01) | |
| C08G 18/79 | (2006.01) | |
| C09D 175/04 | (2006.01) | |
| C09D 175/06 | (2006.01) | |
| C09D 175/08 | (2006.01) | |

(52) U.S. Cl.
CPC ....... *C09D 175/08* (2013.01); *C08G 18/3221* (2013.01); *C08G 18/7831* (2013.01); *C08G 18/792* (2013.01); *C09D 175/04* (2013.01); *C09D 175/06* (2013.01)

(58) Field of Classification Search
CPC .. C09D 175/08; C09D 175/06; C09D 175/04; C08G 18/7831; C08G 18/792; C08G 18/3221
See application file for complete search history.

(56) References Cited

U.S. PATENT DOCUMENTS

| | | | |
|---|---|---|---|
| 3,049,513 A | 8/1962 | Damusis | |
| 3,505,001 A | 4/1970 | Wagner | |
| 4,304,683 A | 12/1981 | Morinaka et al. | |
| 4,360,447 A | 11/1982 | Morinaka et al. | |
| 5,866,657 A * | 2/1999 | Tominaga | C08G 18/6229 524/366 |
| 6,864,312 B2 | 3/2005 | Moore | |
| 7,344,758 B2 | 3/2008 | Franchina et al. | |
| 8,349,986 B2 | 1/2013 | Rukavina et al. | |
| 8,586,697 B2 | 11/2013 | Elizalde et al. | |
| 9,260,605 B2 * | 2/2016 | Sworen | C08L 33/10 |
| 2003/0120101 A1 | 6/2003 | Lai | |
| 2003/0236340 A1 | 12/2003 | Kubicek et al. | |
| 2005/0085573 A1 | 4/2005 | Sandner et al. | |
| 2006/0052556 A1 | 3/2006 | Franchina et al. | |
| 2006/0151739 A1 | 7/2006 | Sandner et al. | |
| 2007/0009663 A1 | 1/2007 | Wang et al. | |
| 2007/0167601 A1 | 7/2007 | Rukavina et al. | |
| 2008/0146750 A1 | 6/2008 | Corn et al. | |
| 2010/0124649 A1 | 5/2010 | Rukavina et al. | |
| 2010/0190397 A1 | 7/2010 | Duschek et al. | |
| 2013/0288066 A1 | 10/2013 | Reiners et al. | |
| 2014/0031483 A1 | 1/2014 | Elizalde et al. | |
| 2014/0295724 A1 | 10/2014 | Sworen et al. | |
| 2015/0361300 A1 * | 12/2015 | Sworen | C08G 18/4825 524/279 |
| 2016/0090438 A1 * | 3/2016 | Sworen | C08G 18/225 428/423.1 |
| 2016/0090505 A1 * | 3/2016 | Sworen | D06M 15/273 442/83 |
| 2016/0090508 A1 * | 3/2016 | Sworen | C09D 175/06 428/96 |
| 2016/0090560 A1 * | 3/2016 | Sworen | C11D 3/0005 442/83 |

(Continued)

FOREIGN PATENT DOCUMENTS

| | | |
|---|---|---|
| CN | 101914185 A | 12/2010 |
| EP | 2415879 | 8/2010 |

(Continued)

OTHER PUBLICATIONS

Honda et al., Macromolecules, 2005, 38, 5699-5705.

(Continued)

*Primary Examiner* — Patrick D Niland

(57) ABSTRACT

The present invention is a method for imparting surface effects to a substrate using at least one hydrophobic compound with at least one linkage of Formula I:

—NHC(O)—X—                (I)

wherein X is the residue of a cyclic or acyclic sugar alcohol which is substituted with at least one —R$^1$; —C(O)R$^1$; —(CH$_2$CH$_2$O)$_n$(CH(CH$_3$)CH$_2$O)$_m$R$^2$; —(CH$_2$CH$_2$O)$_n$(CH(CH$_3$)CH$_2$O)$_m$C(O)R$^1$; or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each R$^1$ is independently a linear or branched alkyl group having 5 to 29 carbons optionally comprising at least 1 unsaturated bond; and each R$^2$ is independently —H, a linear or branched alkyl group having 6 to 30 carbons optionally comprising at least 1 unsaturated bond, or mixtures thereof.

18 Claims, No Drawings

(56) References Cited

U.S. PATENT DOCUMENTS

| | | | | |
|---|---|---|---|---|
| 2016/0090686 A1* | 3/2016 | Sworen | ............... | D06M 15/277 428/532 |
| 2016/0090687 A1* | 3/2016 | Sworen | ............... | D06M 15/263 428/413 |
| 2016/0090688 A1* | 3/2016 | Sworen | ............... | C08G 18/7831 442/82 |

FOREIGN PATENT DOCUMENTS

| | | |
|---|---|---|
| GB | 887387 | 1/1962 |
| GB | 1360007 | 7/1974 |
| JP | 1972003477 B | 1/1972 |
| JP | 1973004940 | 1/1973 |
| JP | 1983079008 | 5/1983 |
| JP | 1985045678 B2 | 10/1985 |
| JP | 05331130 A | 12/1993 |
| KR | 2009002894 A1 | 1/2009 |
| WO | 200037525 A1 | 6/2000 |
| WO | 2003089477 A1 | 10/2003 |
| WO | 2006024669 A1 | 3/2006 |
| WO | 200640333 A1 | 4/2006 |
| WO | 2009015136 A1 | 1/2009 |
| WO | 2011124710 A | 10/2011 |

OTHER PUBLICATIONS

Mao et al., Effect of additives on microstructure and properties of polyurethane coating film for fabrics, Fangzhi Xuebao (1996), 17(2), 4-7 (Abstract attached).

* cited by examiner

USE OF NON-FLUORINATED OR PARTIALLY FLUORINATED URETHANES IN COATINGS

FIELD OF INVENTION

This invention relates to a method of imparting surface effects to a substrate by contacting the substrate with a hydrophobic organic urethane compound, the compound derived from sugar alcohols.

BACKGROUND OF THE INVENTION

Fluorinated polymer compositions are used in the preparation of a wide variety of surface treatment materials to provide surface effects to substrates. Many such compositions are fluorinated acrylate polymers or copolymers which contain predominantly eight or more carbons in the perfluoroalkyl chain to provide the desired properties. Honda, et al., in *Macromolecules,* 2005, 38, 5699-5705 teach that for perfluoroalkyl chains of greater than 8 carbons, orientation of the perfluoroalkyl groups, designated $R_f$ groups, is maintained in a parallel configuration while for such chains having 6 or less carbons, reorientation occurs. This reorientation is recited to decrease surface properties such as contact angle. Thus, polymers containing shorter perfluoroalkyl chains or having no fluorine content have traditionally exhibited lower performance. Non-fluorinated copolymers are known to provide water repellency and optionally stain release to textiles, but are less effective than the fluorinated counterparts. Fluoroadditives have also been used to improve cleanability of paints, including latex paints, which generally have poor stain and soil resistance.

SUMMARY OF INVENTION

The need exists for non-fluorinated or partially fluorinated compositions that provide surface effects to treated substrates, with performance results comparable to fluorinated treating agents. Also desirable is a non-fluorinated composition that can be bio-based derived. The present invention meets these needs.

The present invention describes non-fluorinated organic urethane compositions useful for imparting surface effects, including decreased surface tension, resistance to blocking, oil repellency, water repellency, stain resistance, dirt pickup resistance, increased contact angle, or increased wetting and leveling of the coating surface, to a substrate, where the copolymer derived from isocyanates and sugar alcohols.

The present invention is a method for imparting surface effects to a substrate comprising contacting all or a portion of a surface of the substrate with a coating composition comprising a coating base and at least one hydrophobic compound having at least one linkage of Formula I:

—NHC(O)—X— 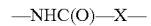 (I)

wherein
X is the residue of a cyclic or acyclic sugar alcohol which is substituted with at least one —R$^1$; —C(O)R$^1$; —(CH$_2$CH$_2$O)$_n$(CH(CH$_3$)CH$_2$O)$_m$R$^2$; —(CH$_2$CH$_2$O)$_n$(CH(CH$_3$)CH$_2$O)$_m$C(O)R$^1$; or mixtures thereof;
where the cyclic or acyclic sugar alcohol is selected from a saccharide, reduced sugar, aminosaccharide, aldonic acid, or aldonic acid lactone; wherein
each n is independently 0 to 20;
each m is independently 0 to 20;
m+n is greater than 0; 
each R$^1$ is independently a linear or branched alkyl group having 5 to 29 carbons optionally comprising at least 1 unsaturated bond; and
each R$^2$ is independently —H, a linear or branched alkyl group having 6 to 30 carbons optionally comprising at least 1 unsaturated bond, or mixtures thereof.

DETAILED DESCRIPTION OF INVENTION

Herein all trademarks are designated with capital letters.

The present invention is a method for imparting surface effects to a substrate comprising contacting all or a portion of a surface of the substrate with a coating composition comprising a coating base and at least one hydrophobic compound having at least one linkage of Formula I:

—NHC(O)—X— (I)

wherein X is the residue of a cyclic or acyclic sugar alcohol which is substituted with at least one —R$^1$; —C(O)R$^1$; —(CH$_2$CH$_2$O)$_n$(CH(CH$_3$)CH$_2$O)$_m$R$^2$; —(CH$_2$CH$_2$O)$_n$(CH(CH$_3$)CH$_2$O)$_m$C(O)R$^1$; or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each R$^1$ is independently a linear or branched alkyl group having 5 to 29 carbons optionally comprising at least 1 unsaturated bond; and each R$^2$ is independently —H, a linear or branched alkyl group having 6 to 30 carbons optionally comprising at least 1 unsaturated bond, or mixtures thereof.

The cyclic or acyclic sugar alcohol is selected from a saccharide, reduced sugar, aminosaccharide, aldonic acid, or aldonic acid lactone, and is substituted with at least one —R$^1$; —C(O)R$^1$; —(CH$_2$CH$_2$O)$_n$(CH(CH$_3$)CH$_2$O)$_m$R$^2$; —(CH$_2$CH$_2$O)$_n$(CH(CH$_3$)CH$_2$O)$_m$C(O)R$^1$; or mixtures thereof. Such a substitution provides hydrophobic properties to the final product. In one aspect, the cyclic or acyclic sugar alcohol is substituted with at least two —R$^1$; —C(O)R$^1$; —(CH$_2$CH$_2$O)$_n$(CH(CH$_3$)CH$_2$O)$_m$R$^2$; —(CH$_2$CH$_2$O)$_n$(CH(CH$_3$)CH$_2$O)$_m$C(O)R$^1$; or mixtures thereof, and in another aspect, the cyclic or acyclic sugar alcohol is substituted with at least three —R$^1$; —C(O)R$^1$; —(CH$_2$CH$_2$O)$_n$(CH(CH$_3$)CH$_2$O)$_m$R$^2$; —(CH$_2$CH$_2$O)$_n$(CH(CH$_3$)CH$_2$O)$_m$C(O)R$^1$; or mixtures thereof. Examples of such sugar alcohols (b') include but are not limited to aldoses and ketoses such as those compounds derived from tetroses, pentoses, hexoses, and heptoses. Specific examples include glucose, glyceraldehyde, erythrose, arabinose, ribose, arabinose, allose, altrose, mannose, xylose, lyxose, gulose, glactose, talose, fructose, ribulose, mannoheptulose, sedohelptulose, threose, erythritol, threitol, glucopyranose, mannopyranose, talopyranose, allopyranose, altropyranose, idopyranose, gulopyranose, glucitol, mannitol, erythritol, sorbitol, arabitol, xylitol, ribitol, galactitol, fucitol, iditol, inositol, pentaerythritol, dipentaerythritol, volemitol, gluconic acid, glyceric acid, xylonic acid, galactaric acid, ascorbic acid, citric acid, gluconic acid lactone, glyceric acid lactone, xylonic acid lactone, glucosamine, galactosamine, or mixtures thereof. The cyclic or acyclic sugar alcohols are substituted with at least one —R$^1$; —C(O)R$^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$ by any suitable method, including esterification with a fatty acid, to form hydroxy-functional substituted sugar alcohols. In one embodiment, the fatty acid substitution of the cyclic or acyclic sugar alcohols has a melting point of at least −59° C. In another embodiment, the fatty acid substitution of the cyclic or acyclic sugar alcohols has a melting point of at least 0° C., and in a third embodiment, the fatty acid substitution of the cyclic or acyclic sugar alcohols has a melting point of at least 40° C. Suitable fatty acids include, but are not limited to, caprylic acid, capric acid, lauric acid, mysteric acid, palmitic acid, stearic acid, arachidic acid, behenic acid, lignoceric acid, palmitoleic acid, lineolic acid, oleic acid, erucic acid, and mixtures thereof. In one embodiment, $R^1$ is a linear or branched alkyl group having 7 to 29 carbons, in another embodiment, $R^1$ is a linear or branched alkyl group having 9 to 29 carbons, and in another embodiment, $R^1$ is a linear or branched alkyl group having 11 to 21 carbons. In one embodiment, $R^2$ is a linear or branched alkyl group having 8 to 30 carbons, in another embodiment, $R^2$ is a linear or branched alkyl group having 10 to 30 carbons, and in another embodiment, $R^2$ is a linear or branched alkyl group having 12 to 22 carbons. In another aspect, $R^2$ is H and m is a positive integer.

In one embodiment, X is selected from Formulas (IIa), (IIb), or (IIc):

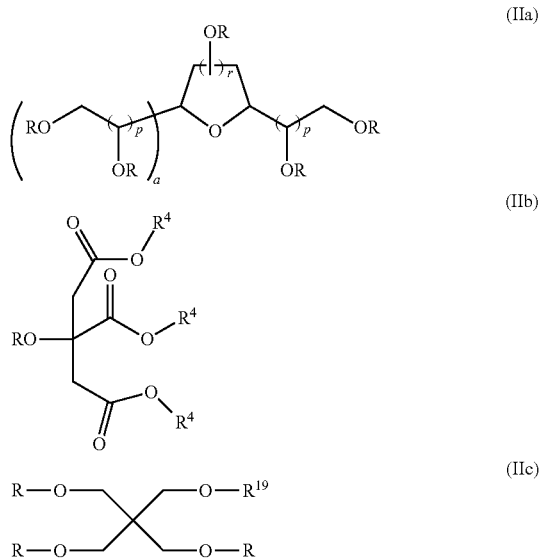

wherein each R is independently a direct bond to NHC(O) of Formula I; —H; —$R^1$; —C(O)$R^1$; —$(CH_2CH_2O)_n(CH(CH_3)CH_2O)_mR^2$; or —$(CH_2CH_2O)_n(CH(CH_3)CH_2O)_mC(O)R^1$; each n is independently 0 to 20; each m is independently 0 to 20; m+n is greater than 0; r is 1 to 3; a is 0 or 1; p is independently 0 to 2; provided that a is 0 when r is 3; each $R^1$ is independently a linear or branched alkyl group having 5 to 29 carbons optionally comprising at least 1 unsaturated bond; each $R^2$ is independently —H, or a linear or branched alkyl group having 6 to 30 carbons optionally comprising at least 1 unsaturated bond; or a mixtures thereof, provided when the compound is Formula (IIa), then at least one R is a direct bond to NHC(O) of Formula 1; and at least one R is a —$R^1$; —C(O)$R^1$; —$(CH_2CH_2O)_n(CH(CH_3)CH_2O)_mR^2$; or —$(CH_2CH_2O)_n(CH(CH_3)CH_2O)_mC(O)R^1$; each $R^4$ is independently a direct bond to NHC(O) of Formula I; —H, a linear or branched alkyl group having 6 to 30 carbons optionally comprising at least 1 unsaturated bond, or combinations thereof; —$(CH_2CH_2O)_n(CH(CH_3)CH_2O)_mR^2$; or —$(CH_2CH_2O)_n(CH(CH_3)CH_2O)_mC(O)R^1$; provided when the compound is Formula (IIb), then at least one R or $R^4$ is a direct bond to NHC(O) of Formula 1; and at least one R or $R^4$ is a linear or branched alkyl group optionally comprising at least 1 unsaturated bond, or combinations thereof; —$(CH_2CH_2O)_n(CH(CH_3)CH_2O)_mR^2$; or —$(CH_2CH_2O)_n(CH(CH_3)CH_2O)_mC(O)R^1$; and each $R^{19}$ is a direct bond to NHC(O) of Formula I; —H, —C(O)$R^1$, or —$CH_2C[CH_2OR]_3$, provided when the compound is Formula (IIc), then at least one $R^{19}$ or R is a direct bond to NHC(O) of Formula I; and at least one $R^{19}$ or R is —C(O)$R^1$, or —$(CH_2CH_2O)_n(CH(CH_3)CH_2O)_mR^2$; or —$(CH_2CH_2O)_n(CH(CH_3)CH_2O)_mC(O)R^1$.

In Formulas (IIa), (IIb), or (IIc), the —$(CH_2CH_2O)$— represents oxyethylene groups (EO) and —$(CH(CH_3)CH_2O)$— represents oxypropylene groups (PO). These compounds can contain only EO groups, only PO groups, or mixtures thereof. These compounds can also be present as a tri-block copolymer designated PEG-PPG-PEG (polyethylene glycol-polypropylene glycol-polyethylene glycol), for example.

Where X is Formula (IIa), any suitable substituted reduced sugar alcohol may be employed, including esters of 1,4-sorbitan, esters of 2,5-sorbitan, and esters of 3,6-sorbitan. In one embodiment, X is selected from Formula (IIa) to be Formula (IIa'):

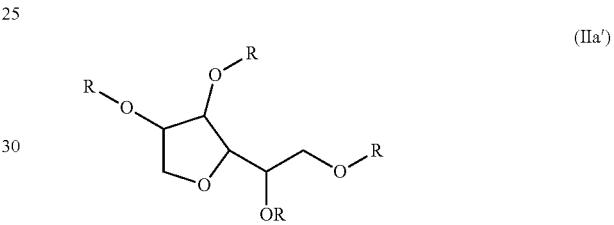

wherein R is further limited to independently a direct bond to NHC(O) of Formula I; —H; —$R^1$; or —C(O)$R^1$. In one embodiment, at least one R is —C(O)$R^1$ or $R^1$. Compounds used to form residues of Formula (IIa'), having at least one of R is —H and at least one R is selected from —C(O)$R^1$, are commonly known as alkyl sorbitans. These sorbitans can be mono-substituted, di-substituted, or tri-substituted with —C(O)$R^1$. It is known that commercially available sorbitans, such as SPAN, contain a mixture of the various sorbitans ranging from where each R is H (un-substituted), and sorbitans where each R is —C(O)$R^1$ (fully substituted); wherein $R^1$ is a linear or branched alkyl group having 5 to 29 carbons; and mixtures of various substitutions thereof. The commercially available sorbitans may also include amounts of sorbitol, isosorbide, or other intermediates or byproducts.

In one embodiment, at least one R is —C(O)$R^1$, and $R^1$ is a linear branched alkyl group having 5 to 29 carbons. In another embodiment, $R^1$ is a linear or branched alkyl group having 7 to 21 carbons, and in a third embodiment, $R^1$ is a linear or branched alkyl group having 11 to 21 carbons. Preferred compounds used to form these residues include mono-, di-, and tri-substituted sorbitans derived from caprylic acid, capric acid, lauric acid, mysteric acid, palmitic acid, stearic acid, arachidic acid, behenic acid, lignoceric acid, and mixtures thereof. Particularly preferred compounds used to form X include mono-, di-, and tri-substituted sorbitan stearates or sorbitan behenins.

Optionally, $R^1$ is a linear or branched alkyl group having 5 to 29 carbons comprising at least 1 unsaturated bond. Examples of compounds used to form residues of Formula (IIa') wherein at least one R is selected from —C(O)$R^1$; and $R^1$ contains least 1 unsaturated bond, include, but are not limited to, sorbitan trioleate (i.e., wherein $R^1$ is —$C_7H_{14}CH$=$CHC_8H_{17}$). Other examples include but are not limited to mono-, di-, and tri-substituted sorbitans derived from palmitoleic acid, lineolic acid, arachidonic acid, and erucic acid.

In one embodiment, X of Formula (IIa') is employed, wherein R is further limited to independently a direct bond to NHC(O) of Formula I; —H; —$(CH_2CH_2O)_n(CH(CH_3)CH_2O)_mR^2$; or —$(CH_2CH_2O)_n(CH(CH_3)CH_2O)_mC(O)R^1$. In this embodiment, at least one R is independently —$(CH_2CH_2O)_n(CH(CH_3)CH_2O)_mR^2$ or —$(CH_2CH_2O)_n(CH(CH_3)CH_2O)_mC(O)R^1$. Compounds forming X of Formula (IIa'), wherein at least one R is —$(CH_2CH_2O)_n(CH(CH_3)CH_2O)_mR^2$ or —$(CH_2CH_2O)_n(CH(CH_3)CH_2O)_mC(O)R^1$, wherein each m is independently 0 to 20, each n is independently 0 to 20, and n+m is greater than 0 are known as polysorbates and are commercially available under the tradename TWEEN. These polysorbates can be mono-substituted, di-substituted, or tri-substituted with alkyl groups $R^1$ or $R^2$. It is known that commercially available polysorbates, contain a mixture of the various polysorbates ranging from where each $R^2$ is H (unsubsituted), and polysorbates where each $R^1$ is a linear or branched alkyl group having 5 to 29 carbons (fully substituted); and mixtures of various substitutions thereof. Examples of compounds used to form X of Formula (IIa') include polysorbates such as polysorbate tristearate, and polysorbate monostearate. Examples of compounds used to form X of Formula (IIa') wherein m+n is greater than 0, and wherein $R^1$ comprises at least 1 unsaturated bond, include but are not limited to, polysorbate trioleate (wherein $R^1$ is $C_7H_{14}CH$=$CHC_8H_{17}$), are sold commercially under the name Polysorbate 80. Reagents may include mixtures of compounds having various values for R, $R^1$, and $R^2$, and may also include mixtures of compounds where $R^1$ comprises at least one unsaturated bond with compounds where $R^1$ is fully saturated.

In one embodiment, X is selected from Formula (IIb). Compounds used to form X of Formula (IIb) are known as alkyl citrates. These citrates can be present as a mono-substituted, di-substituted, or tri-substituted compound with alkyl groups. It is known that commercially available citrates contain a mixture of the various citrates as well as citric acids from where R and each $R^4$ is —H, ranging to citrates where each $R^4$ is a linear or branched alkyl group having 6 to 30 carbons optionally comprising at least 1 unsaturated bond; and mixtures of various substitutions thereof. Mixtures of citrates having various values for $R^1$, $R^2$, and $R^4$ may be used, and may also include mixtures of compounds where $R^1$ comprises at least one unsaturated bond with compounds where $R^1$ is fully saturated. Alkyl citrates are also commercially available wherein m+n is greater than 0, $R^4$ is —$(CH_2CH_2O)_n(CH(CH_3)CH_2O)_mR^2$; or —$(CH_2CH_2O)_n(CH(CH_3)CH_2O)_mC(O)R^1$ and are present in the various substitutions from wherein R and each $R^2$ is H to wherein each $R^1$ and/or $R^2$ is a linear or branched alkyl group having 5 to 30 carbons optionally comprising at least 1 unsaturated bond. Examples of compounds used to form X of Formula (IIb) include, but are not limited to, trialkyl citrates.

In one embodiment, X is selected from Formula (IIc). Compounds used to form X of Formula (IIc) are known as pentaerythriol esters. These pentaerythriol esters can be present as a mono-substituted, di-substituted, or tri-substituted with alkyl groups. Preferred compounds used to form X of Formula (IIc) are dipentaerythriol esters, where $R^{19}$ is —$CH_2C[CH_2OR]_3$. It is known that commercially available pentaerythriol esters contain a mixture of the various pentaerythriol esters where $R^{19}$ and each R is —H, ranging to pentaerythriol esters where each R is —$C(O)R^1$, and $R^1$ is a linear or branched alkyl group having 5 to 29 carbons optionally comprising at least 1 unsaturated bond; and mixtures of various substitutions thereof. The pentaerythriol esters also may contain compounds with mixtures of different chain lengths for R, or mixtures of compounds where $R^1$ comprises at least one unsaturated bond with compounds where $R^1$ is fully saturated.

Residue X of Formulas (IIa), (IIb), and (IIc) can all be bio-based derived. By "bio-based derived", it is meant that at least 10% of the material can be produced from non-crude oil sources, such as plants, other vegetation, and tallow. In one embodiment, X is from about 10% to 100% bio-based derived. In one embodiment, X is from about 35% to 100% bio-based derived. In another embodiment, X is from about 50% to 100% bio-based derived. In one embodiment, X is from about 75% to 100% bio-based derived. In one embodiment, X is 100% bio-based derived. The average OH value of the substituted sugar alcohol compounds used to form X can range from just greater than 0 to about 230. In one embodiment, the average OH value is from about 10 to about 175, and in another embodiment, the average OH value is from about 25 to about 140.

In one embodiment, the hydrophobic urethane compound further comprises at least one moiety Q to form Formula (I'):

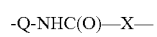
$$\text{-Q-NHC(O)—X—} \qquad (I')$$

where Q is a monovalent, divalent, or polyvalent moiety selected from linear or branched, cyclic or acyclic, alkylene groups optionally containing at least one group selected from alkoxy, phenyl, siloxane, urethane, urea, biuret, uretdione, cyclized isocyanate, allophanate, or isocyanurate. Moiety Q can be formed from an isocyanate, diisocyanate, or polyisocyanate compound. In one embodiment, Q is the residue of an isocyanate, diisocyanate, or polyisocyanate, herein defined as the molecular structure of an isocyanate, diisocyanate, or polyisocyanate where all isocyanate groups NCO have been removed. For example, one method of making the compounds of the present invention includes reacting (b) a substituted sugar alcohol compound, or mixtures thereof, with (a) an isocyanate group-containing compound selected from an isocyanate, diisocyanate, polyisocyanate, or mixture thereof. Where multiple isocyanate groups are present, the isocyanate group-containing compound adds to the branched nature of the polymer. The term "polyisocyanate" is defined as di- and higher-functional isocyanates, and the term includes oligomers. Any monoisocyanate or polyisocyanate having predominately two or more isocyanate groups, or any isocyanate precursor of a polyisocyanate having predominately two or more isocyanate groups, is suitable for use in this invention. For example, hexamethylene diisocyanate homopolymers are suitable for use herein and are commercially available. In this case, Q would be a linear $C_6$ alkylene having cyclized isocyanate groups. It is recognized that minor amounts of diisocyanates can remain in products having multiple isocyanate groups. An example of this is a biuret containing residual small amounts of hexamethylene diisocyanate.

Also suitable for use as the polyisocyanate reactant are hydrocarbon diisocyanate-derived isocyanurate trimers, where Q is a trivalent linear alkylene having an isocyanurate group. Preferred is DESMODUR N-100 (a hexamethylene diisocyanate-based compound available from Bayer Corporation, Pittsburgh, Pa.). Other triisocyanates useful for the purposes of this invention are those obtained by reacting three moles of toluene diisocyanate, where Q is a trivalent polyaromatic ring structure having a cyclized isocyanate group. The isocyanurate trimer of toluene diisocyanate and that of 3-isocyanatomethyl-3,4,4-trimethylcyclohexyl isocyanate are other examples of triisocyanates useful for the purposes of this invention, as is methane-tris-(phenylisocyanate). Precursors of polyisocyanate, such as diisocyanate, are also suitable for use in the present invention as substrates for the polyisocyanates. DESMODUR N-3300, DESMODUR N-3600, DESMODUR Z-4470, DESMODUR H, DESMODUR N3790, and DESMODUR XP 2410, from Bayer Corporation, Pittsburgh, Pa., and bis-(4-isocyanato-cylohexyl)methane are also suitable in the invention.

Preferred polyisocyanate reactants are the aliphatic and aromatic polyisocyanates containing biuret structures, or polydimethyl siloxane containing isocyanates. Such polyisocyanates can also contain both aliphatic and aromatic substituents.

Preferred as the (poly)isocyanate reactant for all the embodiments of the invention herein are hexamethylene diisocyanate homopolymers commercially available, for instance as DESMODUR N-100, DESMODUR N-75 and DESMODUR N-3200 from Bayer Corporation, Pittsburgh, Pa.; 3-isocyanatomethyl-3,4,4-trimethylcyclohexyl isocyanate available, for instance as DESMODUR I (Bayer Corporation); bis-(4-isocyanatocylohexyl)methane available, for instance as DESMODUR W (Bayer Corporation) and diisocyanate trimers of formulas:

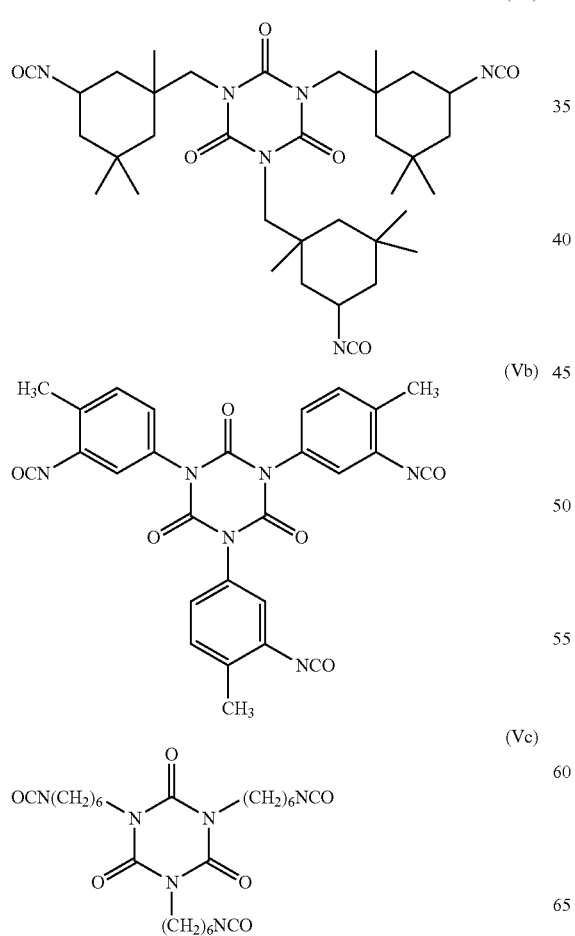

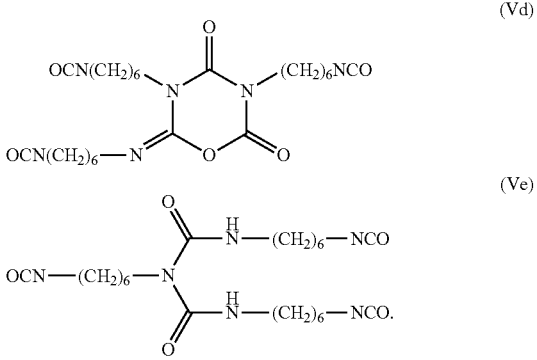

The diisocyanate trimers (Va-d) are available, for instance as DESMODUR Z4470, DESMODUR IL, DESMODUR N-3300, and DESMODUR XP2410, respectively, from Bayer Corporation. In one embodiment, Q is selected from Formulas (IIIa), (IIIb), (IIIc) and (IIId):

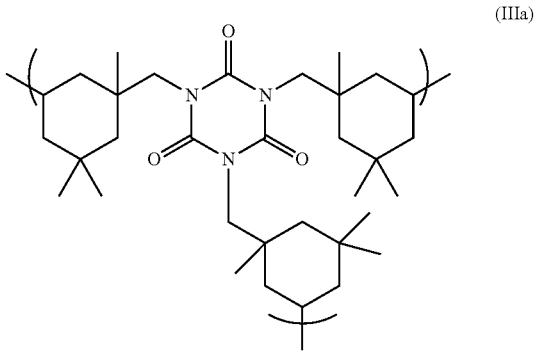

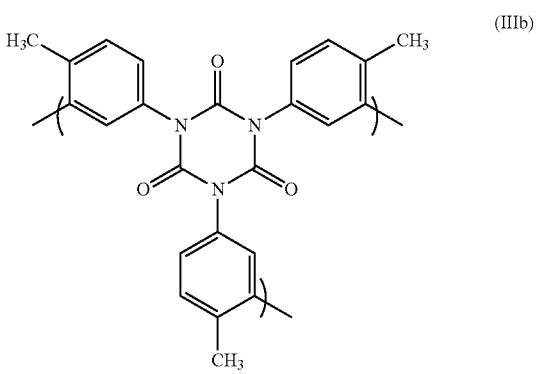

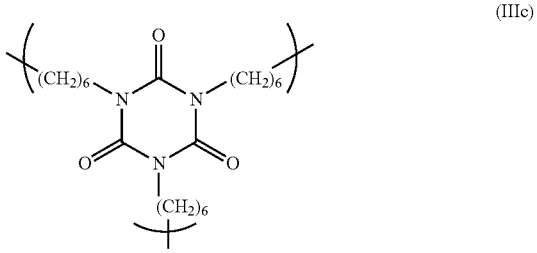

-continued

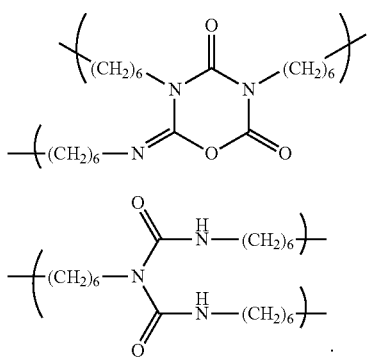

In one embodiment, the hydrophobic compound further comprises at least one linkage selected from Formulas (IVa), (IVb), (IVc), or mixtures thereof:

$$R^6-D \qquad (IVa),$$

$$R^{15}-(OCH_2CH(OR^{16})CH_2)_z-OR^{17} \qquad (IVb),$$

$$-NH-C(O)-NH-X \qquad (IVc)$$

wherein D is selected from $-N(R^{12})-C(O)-NH-$, $-OC(O)NH-$, $-C(O)NH-$, $-SC(O)NH-$, $-O-(CH_2CH_2O)_s(CH(CH_3)CH_2O)_t-C(O)NH-$, or $-[C(O)]-O-(CH_2CH_2O)_s(CH(CH_3)CH_2O)_t-C(O)NH-$; X is defined as above; $R^6$ is selected from a $-C_1$ to $C_{30}$ linear or branched alkyl optionally comprising at least one unsaturated group, a hydroxy- or urethane-functional $C_1$ to $C_{30}$ linear or branched alkyl, a hydroxy- or urethane-functional linear or branched $C_1$ to $C_{30}$ polyether, a hydroxy- or urethane-functional linear or branched polyester having a polyester polymer backbone, a hydroxy- or urethane-functional linear or branched organosiloxane, an amine- or urea-functional linear or branched organosiloxane, a thiol- or thiocarbonate functional $C_1$ to $C_{30}$ linear or branched alkyl, an amine- or urea-functional $C_1$ to $C_{30}$ linear or branched alkyl,

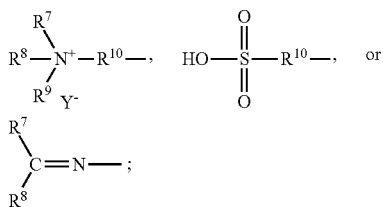

wherein $R^7$, $R^8$, and $R^9$ are each independently, $-H$, $-C_1$ to $C_6$ alkyl, or combinations thereof; $R^{10}$ is a divalent alkyl group of 1 to 20 carbons; $R^{12}$ is $-H$ or a monovalent C1 to C6 alkyl group; $R^{15}$, $R^{16}$, and $R^{17}$ are each independently a $-H$, $-C(O)NH-$, $-R^{18}$; or $-C(O)R^{18}$ provided that at least one $R^{15}$, $R^{16}$, or $R^{17}$ is a $-C(O)NH-$; $R^{18}$ is independently a linear or branched alkyl group having 5 to 29 carbons optionally comprising at least 1 unsaturated bond; z is 1 to 15; Y is Cl; s is an integer of 0 to 50; t is an integer of 0 to 50; and s+t is greater than 0. Such a linkage may be formed by reacting active isocyanate groups with another isocyanate-reactive compound (c) selected from water, organic compounds of Formula (VIa)

$$R^5-A \qquad (VIa), or$$

organic compounds of Formula (VIb)

$$R^3-(OCH_2CH(OR^3)CH_2)_z-OR^3 \qquad (VIb),$$

or mixtures thereof, wherein $R^5$ is selected from a $-C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester having a polyester polymer backbone, a hydroxy-functional linear or branched organosiloxane, an amine-functional linear or branched organosiloxane, a thiol-functional $C_1$ to $C_{30}$ linear or branched alkyl, an amine-functional $C_1$ to $C_{30}$ linear or branched alkyl, A is selected from $-N(R^{12})H$, $-OH$, $-COOH$, $-SH$, $-O-(CH_2CH_2O)_s(CH(CH_3CH_2O)_t-H$, or $(C(O)-O-(CH_2CH_2O)_s(CH(CH_3)CH_2O)_t H$; $R^3$ is independently selected from $-H$; $-R^{18}$; or $-C(O)R^{18}$, provided that at least one $R^3$ is $-H$; z is defined as above; $R^{12}$ is defined as above; $R^{18}$ is defined as above; and s and t are defined as above. The term "branched", as used herein, means that the functional chain can be branched at any point, for example as a quarternary substituted carbon, and can contain any number of branched substitutions.

Preferably, the final compound contains 0% to about 1% of reactive isocyanate groups. In one embodiment, the molecular weight of the hydrophobic compound is at least 10,000 g/mol. In one embodiment, the linkage of Formula (I) composes 30 to 100% by mol of the total urethane linkages in the hydrophobic compound. When optimum durable water repellency is desired, the linkage of Formula (I) composes 80 to 100% by mol of the total urethane linkages in the hydrophobic compound. In another embodiment, the linkage of Formula (I) composes 90 to 100% by mol of the total urethane linkages in the hydrophobic compound. In a third embodiment, the linkage of Formula (I) composes 95 to 100% by mol of the total urethane linkages in the hydrophobic compound.

When optimum cleanability is desired, the compound selected from Formula (VIa), (VIb), or water reacts with about 0.1 mol % to about 70 mol % of reactive isocyanate groups, and the substituted sugar alcohols react with about 30 mol % to about 99.9 mol % of reactive isocyanate groups, to form a urethane compound where about 30 mol % to about 99.9 mol % of total urethane linkages present in the compound fit Formula (I) and about 0.1 mol % to about 70 mol % of total reactive isocyanate groups present fit one or more of Formulas (IVa), (IVb), or (IVc). In another embodiment, the compound selected from Formula (VIa), (VIb), or water reacts with about 40 mol % to about 70 mol % of reactive isocyanate groups, and the substituted sugar alcohols react with about 30 mol % to about 60 mol % of reactive isocyanate groups, to form a urethane compound where about 30 mol % to about 60 mol % of total urethane linkages present in the compound fit Formula (I) and about 40 mol % to about 70 mol % of total reactive isocyanate groups present fit one or more of Formulas (IVa), (IVb), or (IVc). Preferably the number of linkages of Formula (I) is greater than the sum of linkages of Formulas (IVa), (IVb), and (IVc).

In one embodiment, the linkage of Formula (IVc) is present in the hydrophobic compound. Such a linkage is a urea functional group and can be formed from reacting water with active isocyanate groups in the compound. In a further embodiment, the linkage of Formula (IVa) is present, where D is —O—$(CH_2CH_2O)_s(CH(CH_3)CH_2O)_t$—C(O)NH—, or —[C(O)]—O—$(CH_2CH_2O)_s(CH(CH_3)CH_2O)_t$—C(O)NH—. Such a linkage may be formed by reacting a compound of Formula (VIa). Such a compound can be a hydrophilic water-solvatable material comprising at least one hydroxy-terminated polyether of Formula (VIa) wherein isocyanate-reactive group A is —O—$(CH_2CH_2O)_s(CH(CH_3)CH_2O)_t$—H or —[C(O)]—O—$(CH_2CH_2O)_s(CH(CH_3)CH_2O)_t$—H. In this embodiment, —$(CH_2CH_2O)$— represents oxyethylene groups (EO) and —$(CH(CH_3)CH_2O)$— represents oxypropylene groups (PO). These polyethers can contain only EO groups, only PO groups, or mixtures thereof. These polyethers can also be present as a tri-block copolymer designated PEG-PPG-PEG (polyethylene glycol-polypropylene glycol-polyethylene glycol). Preferably, the polyethers are the commercially available methoxypolyethylene glycols (MPEG's), or mixtures thereof. Also commercially available, and suitable for the preparation of the compositions of the present invention, are butoxypolyoxyalkylenes containing equal amounts by weight of oxyethylene and oxypropylene groups (Union Carbide Corp. 50-HB Series UCON Fluids and Lubricants) and having an average molecular weight greater than about 1000. In one aspect, the hydroxy-terminal polyethers of Formula (VIa) have an average molecular weight equal to or greater than about 200. In another aspect, the average molecular weight is between 350 and 2000.

In another embodiment, the linkage of Formula (IVa) is present, where D is —N($R^{12}$)—C(O)—NH—, —OC(O)NH—, —C(O)NH—, or —SC(O)NH—. Such a linkage may be formed from an organic compound of Formula (VIa), where isocyanate-reactive group A is —OH, —C(O)OH, —SH, or —NH($R^{12}$); and $R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester having a polyester polymer backbone, a hydroxy- or amine-functional linear or branched organosiloxane, a thiol-functional $C_1$ to $C_{30}$ linear or branched alkyl, an amine-functional $C_1$ to $C_{30}$ linear or branched alkyl.

Where D is —OC(O)NH— or A is —OH, examples of Formula (VIa) include but are not limited to alkyl alcohols such as propanol, butanol, or fatty alcohols including stearyl alcohol ($R^5$ is a —$C_1$ to $C_{30}$ linear or branched alkyl optionally comprising at least one unsaturated group); alkyl diols or polyols such as ethanediol, propanediol, butanediol, or hexanediol ($R^5$ is a hydroxy-functional $C_1$ to $C_{30}$ linear or branched alkyl); alkylene glycol ethers such as triethylene glycol, tetraethylene glycol, poly(ethylene glycol) (PEG), poly(propylene glycol) (PPG), poly(tetrahydrofuran), or glycol ethers having mixtures of PEG, PPG, or THF units ($R^5$ is a hydroxy-functional linear or branched $C_1$ to $C_{30}$ polyether); polyester polyols ($R^5$ is a hydroxy-functional linear or branched polyester having a polyester polymer backbone); silicone prepolymer polyols ($R^5$ is a hydroxy-functional linear or branched organosiloxane); N,N-dimethylaminoethanol ($R^5$ is an amine-functional $C_1$ to $C_{30}$ linear or branched alkyl); choline chloride or betaine HCl ($R^5$ is $Y^-$($R^7$)($R^8$)($R^9$)$N^+R^{10}$—); butanone oxime ($R^5$ is ($R^7$)($R^8$)C=N—). The polyether polyols can contain only EO groups, only PO groups, only THF groups, or mixtures thereof. These polyethers can also be present as a block copolymer, such as that designated by PEG-PPG-PEG (polyethylene glycol-polypropylene glycol-polyethylene glycol). In one aspect, the polyether glycols have an average molecular weight equal to or greater than about 200. In another aspect, the average molecular weight is between 350 and 2000.

Where D is —C(O)NH— or A is —COOH, examples of Formula (VIa) include but are not limited to fatty acids such as caprylic acid, capric acid, lauric acid, mysteric acid, palmitic acid, stearic acid, arachidic acid, behenic acid, lignoceric acid, palmitoleic acid, lineolic acid, arachidonic acid, oleic acid, or erucic acid ($R^5$ is a —$C_1$ to $C_{30}$ linear or branched alkyl optionally comprising at least one unsaturated group); hydroxy-containing acids such as hydroxycaprylic acid, hydroxycapric acid, hydroxylauric acid, hydroxymysteric acid, hydroxypalmitic acid, hydroxystearic acid, hydroxyarachidic acid, hydroxybehenic acid, hydroxylignoceric acid, hydroxypalmitoleic acid, hydroxylineolic acid, hydroxyarachidonic acid, hydroxyoleic acid, or hydroxyerucic acid ($R^5$ is a hydroxy-functional $C_1$ to $C_{30}$ linear or branched alkyl); and mercaptoalkanoic acids such as mercaptopropionic acid ($R^5$ is a thiol-functional $C_1$ to $C_{30}$ linear or branched alkyl).

Where D is —SC(O)NH— or A is —SH, specific examples of Formula (VIa) include but are not limited to alkyl thiols such as lauryl mercaptan or dodecyl mercaptan ($R^5$ is a —$C_1$ to $C_{30}$ linear or branched alkyl optionally comprising at least one unsaturated group). Where D is —N($R^{12}$)—C(O)—NH— or A is —NH($R^{12}$), specific examples of Formula (VIa) include but are not limited to alkyl amines such as diisopropylamine, propylamine, hexylmine, or laurylamine ($R^5$ is a —$C_1$ to $C_{30}$ linear or branched alkyl optionally comprising at least one unsaturated group); alkanolamines such as ethanolamine or propanolamine ($R^5$ is a hydroxy-functional $C_1$ to $C_{30}$ linear or branched alkyl); silicone prepolymer polyamines ($R^5$ is a amine-functional linear or branched organosiloxane); alkyl diamines ($R^5$ is an amine-functional $C_1$ to $C_{30}$ linear or branched alkyl); and aminoalkanesulfonic acids such as 2-aminoethanesulfonic acid ($R^5$ is HO—$S(O)_2R^{10}$—).

In a further embodiment, the hydrophobic compound comprises a linkage of Formula (IVb). Such linkages may be formed by the reaction of active isocyanate groups with a compound of Formula (VIb). These compounds are commonly referred to as polyglycerols. These polyglycerols can be present where $R^3$ is independently a —H; —$R^{18}$; —C(O)$R^{18}$ provided that at least one $R^3$ is a —H; and wherein $R^{18}$ is independently a linear or branched alkyl group having 5 to 29 carbons optionally comprising at least 1 unsaturated bond. Specific examples include but are not limited to triglycerol monostearate, triglycerol distearate, hexaglycerol monostearate, hexaglycerol distearate, decaglyceryl mono (carpylate/caprate), decaglyceryl di(carpylate/caprate), decaglycerol, polyglycerol-3, and C18 diglyceride.

In one embodiment, the hydrophobic compound comprises more than one type of linkages selected from Formulas (IVa), (IVb), and (IVc). In addition to compounds of the present invention as described herein, these compositions may also comprise additional compounds that are present from commercially available sorbitans, polysorbates, alkyl citrates, or pentaethritols. These compounds can be present as a mixture of the various substituted sugar alcohols from fully unsubstituted to fully substituted, and the various substitutions in between, and optionally, the linear or branched alkyl group having 5 to 29 carbons comprises at least 1 unsaturated bond.

In one embodiment, the urethane compound is synthesized as part of an aqueous composition. However, the composition may further comprise a solvent selected from organic solvents. The aqueous composition is in the form of an aqueous solution, an aqueous emulsion, or an aqueous dispersion.

The compounds can be made in one step. The compositions comprising products of more than one substituted sugar alcohol residue and/or one or more linkages of Formulas (IVa), (IVb), and (IVc) can be also made in one step. In one embodiment, if more than one substituted sugar alcohol residue and/or one or more linkages of Formulas (IVa), (IVb), and (IVc) are present, then the synthesis can be completed sequentially. A sequential addition is especially useful when employing substituted sugar alcohols with high OH numbers, or when using polyfunctional compounds of Formulas (VIa) or (VIb). These steps comprise reacting (a) at least one isocyanate group-containing compound selected from isocyanate, diisocyanate, polyisocyanate, or mixtures thereof, and (b) at least one substituted sugar alcohol. When a second compound is used selected from water, Formula (VIa), or Formula (VIb), molar concentrations of the at least one substituted sugar alcohol are such that there remains unreacted isocyanate groups to react with the one or more compounds selected from water, Formula (VIa), or Formula (VIb).

This reaction is typically conducted by charging a reaction vessel with the isocyanate, diisocyanate, or polyisocyanate, and at least one substituted sugar alcohol, and optionally a second compound selected from water, Formula (VIa), or Formula (VIb). The order of reagent addition is not critical, but if water is used, the water should be added after the isocyanates and at least one substituted sugar alcohol are reacted.

The specific weight of the reactants charged is based on their equivalent weights and on the working capacity of the reaction vessel, and is adjusted so that substituted sugar alcohol will be consumed in the first step. A suitable dry organic solvent free of isocyanate-reactive groups is typically used as a solvent. Ketones are the preferred solvents, and methylisobutylketone (MIBK) is particularly preferred for convenience and availability. The charge is agitated, and temperature adjusted to about 40° C. to 70° C. Typically, a catalyst such as iron(III) chloride in an organic solvent is then added, typically in an amount of from about 0.01 to about 1.0 weight % based on the dry weight of the composition, and the temperature is raised to about 80° C. to 100° C. A co-catalyst, such as sodium carbonate, may also be used. If water is to be added, the initial reaction is conducted so that less than 100% of the isocyanate groups are reacted. In the second step after holding for several hours, additional solvent, water, and optionally a second compound are added. In one embodiment, and the mixture is allowed to react for several more hours or until all of the isocyanate has been reacted. Additional water can then be added along with surfactants, if desired, to the urethane compounds and stirred until thoroughly mixed. Following a homogenization or sonification step, the organic solvent can be removed by evaporation at reduced pressure, and the remaining aqueous solution or dispersion of the compound of the present invention can be used as is or subjected to further processing. The aqueous composition comprises at least one hydrophobic compound of the present invention, a water carrier, and optionally one or more surfactants.

It will be apparent to one skilled in the art that many changes to any or all of the above procedures can also be used to optimize the reaction conditions for obtaining maximum yield, productivity, or product quality.

In addition to the hydrophobic compounds of the present invention as described herein, the aqueous compositions may also comprise compounds that are present from commercially available sorbitans, polysorbates, alkyl citrates, or pentaethritols. These compounds can be present as a mixture of the various substituted organic compounds of Formula (IIa), (IIb), or (IIc) from fully unsubstituted to fully substituted, and the various substitutions in between, and optionally, the linear or branched alkyl group having 5 to 29 carbons comprises at least 1 unsaturated bond.

As used herein, the term "coating base" is a composition that is applied to a substrate for the purpose of creating a lasting film on the substrate surface. In one embodiment, the coating base is selected from the group consisting of an acrylic polymer, epoxy polymer, vinyl polymer, and polyurethane polymer in the form of an interior house paint, exterior house paint, stain, or clear coating. Such paints are readily available in the marketplace under a number of major brands. Such coatings may be unpigmented or may be pigmented with compounds including but not limited to titanium dioxide.

The urethane composition as described herein is effectively introduced to the coating base by thoroughly contacting, e.g., by mixing the fluoropolymer composition with the coating base. The contacting of the urethane compound and coating base can be performed, for example, at ambient temperature. More elaborate contacting or mixing methods can be employed, such as using a mechanical shaker or providing heat. Such methods are generally not necessary and generally do not substantially improve the final coating composition.

When used as an additive to a paint coating base, the composition of the invention is generally added at about 0.001 weight % to about 1 weight % on a dry weight basis of the hydrophobic urethane compound to the weight of the wet paint. In another embodiment, about from about 0.01 weight % to about 0.5 weight %, and in a further embodiment, from about 0.05 weight % to about 0.25 weight % of the hydrophobic urethane compound is added to the paint.

The coating compositions of the present invention are useful for providing a protective and/or decorative coating to a wide variety of substrates. Such substrates include primarily construction materials and hard surfaces. In one embodiment, the substrate is selected from the group consisting of proppant particles, unglazed concrete, brick, tile, granite, limestone, marble, grout, mortar, statuary, monuments, wood, composite materials, terrazzo, gypsum board, and wall and ceiling panels. In one embodiment, the urethane compounds provide a surface effect to the substrate, including but not limited to decreased surface tension, resistance to blocking, oil repellency, water repellency, stain resistance, dirt pickup resistance, increased contact angle, or increased wetting and leveling of the coating surface. Proppant particles are materials used to increase hydrocarbon production from a subterraneran hydrocarbon-containing formation. These particles may include but are not limited to sand, thermoplastic particles, alumina particles, glass bubble or glass bead particles, and clay particles.

In another embodiment, the coating base is selected from the group consisting of a proppant particle treatment solution; treatment solution for hard surfaces such as concrete, brink tile, granite, limestone, marble, statuary, or mortar; floor finish; polishing agent; and floor polish. Proppant particle treatment solutions may include only water or may include additional additives. Floor waxes, polishes, or finishes are generally water-based or solvent-based polymer emulsions. Commercially available floor finish compositions typically are aqueous emulsion-based polymer compositions comprising one or more organic solvents, plasticizers, coating aides, anti-foaming agents, surfactants, polymer emulsions, metal complexing agents, and waxes. The particle size range and solids content of the polymer are usually controlled to control the product viscosity, film hardness and resistance to deterioration. Polymers containing polar groups function to enhance solubility and may also act as wetting or leveling agents providing good optical properties such a high gloss and distinctness of reflected image.

Preferred polymers for use in floor finishes include acrylic polymers, polymers derived from cyclic ethers, and polymers derived from vinyl substituted aromatics. Polyesters, polyamides, polyurethanes and polysiloxanes are also used in floor finishes. The waxes or mixtures of waxes that are used in floor finishes include waxes of a vegetable, animal, synthetic, and/or mineral origin. Representative waxes include, for example, carnuba, candelilla, lanolin, stearin, beeswax, oxidized polyethylene wax, polyethylene emulsions, polypropylene, copolymers of ethylene and acrylic esters, hydrogenerated coconut oil or soybean oil, and the mineral waxes such as paraffin or ceresin. The waxes typically range from 0 to about 15 weight percent and preferably from about 2 to about 10 weight percent based on the weight of the finish composition.

When the coating composition is a floor finish, floor wax, or floor polish, the hydrophobic urethane compounds of the present invention as defined above are effectively introduced to the coating composition by thoroughly stirring it in at room or ambient temperature. More elaborate mixing can be employed such as using a mechanical shaker or providing heat or other methods. The hydrophobic urethane compounds generally are added at about 0.001 weight % to about 5 weight % by dry weight of the coating composition of the invention in the wet composition. In another embodiment, about from about 0.005 weight % to about 2 weight %, more preferably from about 0.005 weight % to about 0.5 weight %, and even more preferably from about 0.01 weight % to about 0.05 weight % is used.

The coatings of the present invention may be used to treat a substrate by contacting the substrate with a coating composition comprising a coating base and a polymer composition of formula (I) and drying or curing the coating composition on the substrate. Any method of contacting a coating composition with a substrate can be used. Such methods are well known to a person skilled in the art, such as by brush, spray, roller, doctor blade, wipe, dip, foam, liquid injection, immersion or casting.

Test Methods and Materials

All solvents and reagents, unless otherwise indicated, were purchased from Sigma-Aldrich, St. Louis, Mo., and used directly as supplied. MPEG 750 is defined as poly(ethylene glycol) methyl ether 750 and is commercially available from Sigma-Aldrich, St. Louis, Mo. Methyl isobutyl ketone (MIBK) is also available from Sigma-Aldrich, St. Louis, Mo.

Sorbitan tristearate and sorbitan monostearate are commercially available from Croda, East Yorkshire, England, or DuPont Nutrition & Health, Copenhagen, Denmark. Sorbitan trioleate was obtained from Croda, East Yorkshire, England.

DESMODUR N-100 and DESMODUR N3300 were obtained from Bayer Corporation, Pittsburgh, Pa.

SILWAX D226 is available from Siltech Corporation, Toronto, Canada.

CHEMIDEX S is a stearaminopropyl dimethylamine surfactant available from Lubrizol, Wickliffe, Ohio.

ETHAL LA-4 is an ethoxylated emulsifier available from Ethox Chemicals, Greenville, S.C.

WITCO C-6094 is a modified alpha-olefin sulfonate surfactant available from AkzoNobel, Chicago, Ill.

6,2-Alcohol is defined as 1H,1H,2H,2H-perfluorooctanol and is available from DuPont Chemicals and Fluoroproducts.

The following test methods and materials were used in the examples herein.

Test Methods

Dosing of Polymer Additives in Paint and Test Panel Application

Aqueous dispersions of urethane polymers of the present invention were added at levels of 1% by weight of polymer (Examples 1-7) or 0.035% of fluorine content (Examples 8-11) to selected commercially available interior and exterior latex paints that were, prior to dosing, free of fluoroadditives. The sample was mixed using an overhead Cowles Blade stirrer at 600 rpm for 10 minutes. The mixture was then transferred to a glass bottle, sealed and placed on a roll mill overnight to allow uniform mixing of the fluoropolymer. The samples were then drawn down uniformly on a black Leneta Mylar® card (5.5"×10") or Aluminium Q-panel (4"×12") via a BYK-Gardner drawdown apparatus using 5 mL bird-applicator. The paint films were then allowed to dry at room temperature for 7 days.

Test Method 1. Evaluation of Water and Oil Repellency via Contact Angle Measurement Water and oil contact angle measurements were used to test for the migration of fluoroadditive to the surface of the paint film. Testing was performed by goniometer on 1 inch strips of Leneta panel coated with dried paint film. A Ramé-Hart Standard Automated Goniometer Model 200 employing DROPimage standard software and equipped with an automated dispensing system, 250 µl syringe, and illuminated specimen stage assembly was used. The goniometer camera was connected through an interface to a computer, allowing the droplet to be visualized on a computer screen. The horizontal axis line and the cross line could both be independently adjusted on the computer screen using the software. Prior to contact angle measurement, the sample was placed on the sample stage and the vertical vernier was adjusted to align the horizontal line (axis) of the eye piece coincident to the horizontal plane of the sample. The horizontal position of the stage relative to the eye piece was positioned so as to view one side of the test fluid droplet interface region at the sample interface.

To determine the contact angle of the test fluid on the sample, approximately one drop of test fluid was dispensed onto the sample using a 30 µL pipette tip and an automated dispensing system to displace a calibrated amount of the test fluid. For oil contact angle measurements, hexadecane was suitably employed, and deionized water was used for water contact angle measurements. Horizontal and cross lines were adjusted via the software in case of the Model 200 after leveling the sample via stage adjustment, and the computer calculated the contact angle based upon modeling the drop appearance. The initial contact angle is the angle determined immediately after dispensing the test fluid to the sample surface. Initial contact angles above 30 degrees are indicators of effective oil repellency.

Test Method 2. Leneta Oil Stain Cleanability for Interior Paints

A modified version of ASTMD3450 was used to determine the oil stain cleanability of painted panels. The test material dosed in interior flat paint was applied to a black Leneta card as described in the application method. The dried samples were cut into a 4"×3" size for testing. A thin, evenly laid layer of Leneta staining medium (5 wt. % dispersion of Leneta carbon black in Vaseline®) was placed on half of the film, and left for 1 hour. The excess stain was gently scrapped off and wiped with a clean paper towel until no visible stain could be wiped off. The panel was then moved to an Gardco abrasion tester covered with 8 layers of cheese cloth at the washing block. The cheesecloth was moisturized with 10 mL of 1% mild detergent solution in water and performed washability via moving the washing block over the stained panel. After 5 cycles, the panel was rinsed with deionized water and left to dry for 12 hours. The whiteness of the unwashed stained paint and washed stained paint were measured using a Hunter lab colorimeter to obtain L values. Cleanability was calculated as per the equation: Cleanability=$(L_{washed\ paint}-L_{unwashed\ stained\ paint}) \times 10/(L_{unstained\ paint}-L_{unwashed\ stained\ paint})$. Similarly a cleanability rating for a control sample that is devoid of fluorinated additive was acessed simultaneously. The difference between the cleanability rating of the sample to the control were determined and represented as a cleanability score $\Delta C$. The higher the $\Delta C$ the better the performance, suggesting that relatively lower amounts of stain remains on the treated sample compared to control. A negative $\Delta C$ indicates that the sample is worse than the control.

COMPARATIVE EXAMPLE A

Paint was tested without any urethane polymer additive, according to the test methods above.

EXAMPLE 1

A dry 4-neck 500 mL round bottom flask was set up with a thermocouple, mechanical stirrer, a nitrogen inlet, condenser, and gas outlet. The flask was charged with DESMODUR N100 (12.13 g), MIBK (91.3 g), and FeCl₃ solution (0.5% by weight in MIBK, 0.25 g). The reaction mixture was heated to 60° C. Sorbitan tristearate (22.28 g), sorbitan trioleate (26.46 g), and sodium carbonate (0.28 g) were added to the flask. The temperature was then raised to 95° C. and the reaction mixture was stirred for 5 hours. Then n-butanol (0.71 g) was added and the reaction was cooled to 80° C. When the reaction tested negative for active isocyanates, warm DI water (246 g), diacetin (11.08 g), CHEMIDEX S (2.89 g), ETHAL LA-4 (1.05 g) and acetic acid (1.48 g) were added and the mixture was stirred for 30 minutes at 75° C. Then the mixture was homogenized for 4 passes at 6000 psi. MIBK was removed via distillation. The product was filtered through a sock filter, diluted to 20.0% solids, standardized to pH 5.0-5.5, and tested according to the test methods above.

EXAMPLE 2

A dry 4-neck 500 mL round bottom flask was set up with a thermocouple, mechanical stirrer, a nitrogen inlet, condenser, and gas outlet. The flask was charged with DESMODUR N3300 (13.76 g), MIBK (32.5 g), and FeCl₃ (0.5% by weight in MIBK, 0.5 g). The reaction mixture was heated to 60° C. MPEG 750 (18.72 g) and Na₂CO₃ (0.63 g) were added to the flask. The temperature was then raised to 95° C. and stirred for 1 hour. Sorbitan tristearate (19.18 g), sorbitan monostearate (5.06 g), and MIBK (24.2 g) were added to the flask, the temperature was set to 95° C., and the reaction was stirred overnight. When the reaction tested negative for active isocyanates, warm DI water (226.9 g), diacetin (22.7 g), and acetic acid (0.75 g) were added, and the mixture was stirred for 30 minutes at 75° C. The mixture was homogenized for 4 passes at 6000 psi, and MIBK was removed via distillation. The product was filtered through a sock filter, diluted to 20.0% solids, standardized to pH 5.0-5.5, and tested according to the test methods above.

EXAMPLE 3

Into a 4-neck round bottom flask equipped with an overhead stirrer, thermocouple and condenser was added sorbitan tristearate (91.7 g) sodium carbonate (1.2 g) and 4-methyl-2-pentanone (MIBK, 125 g). After the solution was heated to 55° C., DESMODUR N100 (25.1 g) was added and the temperature was increased to 80° C. Catalyst was added at 80° C. and then reaction temperature was increased to 95° C. After 6 hours, n-butanol (1.5 g) was added to the reaction mixture. The following morning, the reaction tested negative for active isocyanates.

An aqueous dispersion of the compound was then prepared. Water (400 g), WITCO C-6094 (15.1 g), and dipropylene glycol (29.4 g) were added to a beaker and stirred to form a surfactant solution. The solution was heated to 65° C. The urethane reaction was cooled to 65° C. and the surfactant solution was slowly added to produce a milky solution. The mixture was blended by immersion blender (2 minutes), homogenized at 6000 psi, and the resulting dispersion was distilled under reduced pressure to remove the solvent to yield a urethane dispersion at 19.01% solids after cooling and filtering. The product was tested according to the test methods above.

EXAMPLE 4

Into a 4-neck round bottom flask equipped with an overhead stirrer, thermocouple and condenser was added sorbitan tristearate (92.8 g), sodium carbonate (1.2 g) and MIBK (120 g). After the solution was heated to 55° C., DESMODUR N100 (25.1 g) was added and the temperature was increased to 80° C. Catalyst was added at 80° C. and then the reaction temperature was increased to 95° C. After 6 hours, n-butanol (1.5 g) was added to the reaction mixture. The following morning, the reaction tested negative for active isocyanates and 30.1 g of SILWAX D226 was added to the reaction.

An aqueous dispersion of the compound was then prepared. Water (416 g), WITCO C-6094 (19.0 g), and dipropylene glycol (37.2 g) were added to a beaker and stirred to form a surfactant solution. The solution was heated to 65° C. The urethane reaction was cooled to 65° C. and the surfactant solution was slowly added to produce a milky solution. The mixture was blended by immersion blender (2 minutes), homogenized at 6000 psi, and the resulting dispersion was distilled under reduced pressure to remove the solvent to yield a urethane dispersion at 26.16% solids after cooling and filtering. The product was tested according to the test methods above.

EXAMPLE 5

Into a 4-neck round bottom flask equipped with an overhead stirrer, thermocouple and condenser was added sorbitan tristearate (54.8 g) sodium carbonate (0.4 g) and MIBK (71.8 g). After the solution was heated to 55° C., DESMODUR N100 (15.0 g) was added and the temperature was increased to 80° C. Catalyst was added at 80° C. and then the reaction temperature was increased to 95° C. After 6 hours, n-butanol (0.9 g) was added to the reaction mixture. The following morning, the reaction tested negative for active isocyanates and 17.8 g of SILWAX D226 was added to the reaction.

An aqueous dispersion of the compound was then prepared. Water (213 g), CHEMIDEX S (2.0 g), ETHAL LA-4 (2.5 g) and dipropylene glycol (22.8 g) were added to a beaker and stirred to form a surfactant solution. The solution was heated to 65° C. The urethane reaction was cooled to 65° C. and the surfactant solution was slowly added to produce a milky solution. The mixture was blended by immersion blender (2 minutes), homogenized at 6000 psi, and the resulting dispersion was distilled under reduced pressure to remove the solvent. An additional 0.5 g of CHEMIDEX S was added to yield a urethane dispersion at 32.97% solids after cooling and filtering. The product was tested according to the test methods above.

EXAMPLE 6

Into a 4-neck round bottom flask equipped with an overhead stirrer, thermocouple and condenser was added sorbitan tristearate (55.5 g) sodium carbonate (0.7 g) and MIBK, 72 g. After the solution was heated to 55° C., DESMODUR N100 (15.0 g) was added and the temperature was increased to 80° C. Catalyst was added at 80° C. and then the reaction temperature was increased to 95° C. After 6 hours, n-butanol (0.9 g) was added to the reaction mixture. The following morning, the reaction tested negative for active isocyanates.

An aqueous dispersion of the compound was then prepared. Water (300 g), WITCO C-6094 (4.6 g), and dipropylene glycol (35.4 g) were added to a beaker and stirred to form a surfactant solution. The solution was heated to 65° C. The urethane reaction was cooled to 65° C. and the surfactant solution was slowly added to produce a milky solution. The mixture was immersion blended (2 minutes), homogenized at 6000 psi, and the resulting dispersion was distilled under reduced pressure to remove the solvent to yield a urethane dispersion at 17.52% solids after cooling and filtering. The product was tested according to the test methods above.

EXAMPLE 7

Example 2 was repeated, except that 6,2-alcohol (0.23 g) was added with the sorbitan tristearate and sorbitan monostearate. Amounts were as follows: DESMODUR N3300 (12.36 g), sorbitan tristearate (16.73 g), MPEG 750 (16.82 g), and sorbitan monostearate (4.55 g).

EXAMPLES 8-10

Example 2 was repeated, except that 6,2-alcohol was added with the sorbitan tristearate and sorbitan monostearate according to Table 1.

TABLE 1

Reagent Data for Examples 8-10

| Example | Example 8 | Example 9 | Example 10 |
|---|---|---|---|
| Sorbitan tristearate (g) | 21.5 | 12.64 | 8.84 |
| Sorbitan monostearate (g) | 6.62 | 4.67 | 8.17 |
| DESMODUR N3300 (g) | 18 | 12.7 | 22.2 |
| MPEG 750 (g) | 14.48 | 17.27 | 30.19 |
| 6,2-alcohol (g) | 1.7 | 2.4 | 10.47 |

TABLE 2

Performance Data of Examples 1-10

| Example | Cleanability Rating | Water Contact Angle | Hexadecane Contact Angle |
|---|---|---|---|
| A | 1.8 | 74.9 | 0 |
| 1 | 3.7 | 102.6 | 30.3 |
| 2 | 3.8 | 87.2 | 17.8 |
| 3 | 6.8 | 88.6 | 4.6 |
| 4 | 4.0 | 86.3 | 0 |
| 5 | 4.1 | 84.9 | 20.6 |
| 6 | 2.4 | 86 | 4.4 |
| 7 | 2.6 | 54.8 | 47.4 |
| 8 | 4.6 | 88.9 | 53 |
| 9 | 1.5 | 78.1 | 42.7 |
| 10 | 3.7 | 72 | 28 |

What is claimed is:

1. A method for imparting surface effects to a substrate comprising contacting all or a portion of a surface of the substrate with a coating composition comprising a coating base and at least one hydrophobic compound having at least one linkage of Formula I:

—NHC(O)—X—  (I)

wherein

X is the residue of a cyclic or acyclic sugar alcohol which is substituted with at least two —$R^1$; —C(O)$R^1$; —(CH$_2$CH$_2$O)$_n$(CH(CH$_3$)CH$_2$O)$_m$$R^2$; —(CH$_2$CH$_2$O)$_n$(CH(CH$_3$)CH$_2$O)$_m$C(O)$R^1$; or mixtures thereof;

where the cyclic or acyclic sugar alcohol is selected from a saccharide, reduced sugar, aminosaccharide, aldonic acid, or aldonic acid lactone; wherein each n is independently 0 to 20;

each m is independently 0 to 20;

m+n is greater than 0;

each $R^1$ is independently a linear or branched alkyl group having 5 to 29 carbons optionally comprising at least 1 unsaturated bond; and each $R^2$ is independently —H, a linear or branched alkyl group having 6 to 30 carbons optionally comprising at least 1 unsaturated bond, or mixtures thereof; and wherein the hydrophobic compound has no unreacted isocyanate groups.

2. The method of claim 1, where X is 100% bio-based derived.

3. The method of claim 1, where X is selected from Formulas (IIa), (IIb), or (IIc):

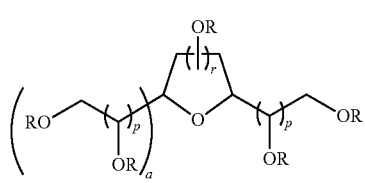

(IIa)

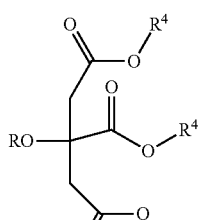

(IIb)

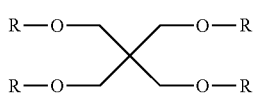

(IIc)

wherein each R is independently a direct bond to NHC(O) of Formula I; —H; —R$^1$; —C(O)R$^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$;

each n is independently 0 to 20;
each m is independently 0 to 20;
m+n is greater than 0;
r is 1 to 3;
a is 0 or 1;
p is independently 0 to 2;
provided that a is 0 when r is 3;
each R$^1$ is independently a linear or branched alkyl group having 5 to 29 carbons optionally comprising at least 1 unsaturated bond;
each R$^2$ is independently —H, or a linear or branched alkyl group having 6 to 30 carbons optionally comprising at least 1 unsaturated bond; or a mixtures thereof,
provided when X is Formula (IIa), then at least one R is a direct bond to NHC(O) of Formula 1; and at least two R groups are a —R$^1$; —C(O)R$^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$;
each R$^4$ is independently a direct bond to NHC(O) of Formula I; —H, a linear or branched alkyl group having 6 to 30 carbons optionally comprising at least 1 unsaturated bond, or combinations thereof; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$;
provided when X is Formula (IIb), then at least one R or R$^4$ is a direct bond to NHC(O) of Formula 1; and at least two R or R$^4$ are a linear or branched alkyl group optionally comprising at least 1 unsaturated bond, or combinations thereof; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$; and
each R$^{19}$ is a direct bond to NHC(O) of Formula I; —H, —C(O)R$^1$, or —CH$_2$C[CH$_2$OR]$_3$,
provided when X is Formula (IIc), then at least one R$^{19}$ or R is a direct bond to NHC(O) of Formula I; and at least two R$^{19}$ or R are —C(O)R$^1$, —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$.

4. The method of claim 1, wherein the hydrophobic compound further comprises at least one moiety Q to form Formula (I'):

-Q-NHC(O)—X—  (I')

where Q is a monovalent, divalent, or polyvalent moiety selected from linear or branched, cyclic or acyclic, alkylene groups optionally containing at least one group selected from alkoxy, phenyl, siloxane, urethane, urea, biuret, uretdione, cyclized isocyanate, allophanate, or isocyanurate.

5. The method of claim 4, wherein Q is selected from Formulas (IIIa), (IIIb), (IIIc) and (IIId):

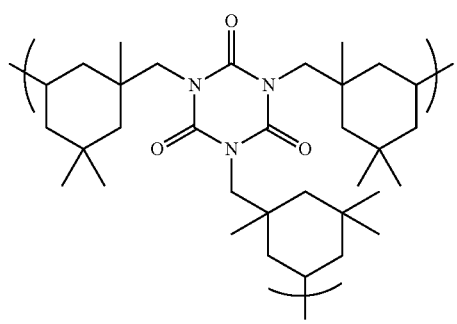

(IIIa)

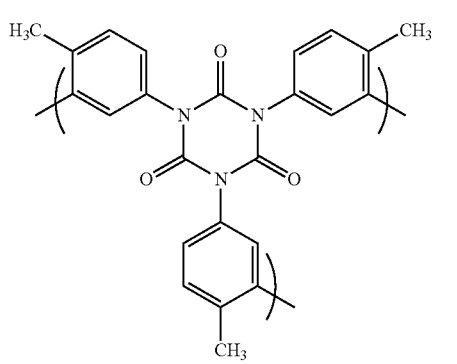

(IIIb)

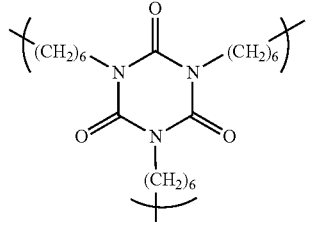

(IIIc)

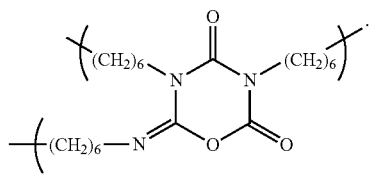

(IIId)

6. The method of claim 1, wherein the hydrophobic compound further comprises at least one linkage selected from Formulas (IVa), (IVb), (IVc), or mixtures thereof:

R$^6$-D  (IVa),

R$^{15}$—(OCH$_2$CH(OR$^{16}$)CH$_2$)$_z$—OR$^{17}$  (IVb),

—NH—C(O)—NH—X  (IVc)

wherein D is selected from —N(R$^{12}$)—C(O)—NH—, —OC(O)NH—, —C(O)NH—, —SC(O)NH—, —O—(CH$_2$CH$_2$O)$_s$(CH(CH$_3$)CH$_2$O)$_t$—C(O)NH—, or —[C(O)]—O—(CH$_2$CH$_2$O)$_s$(CH(CH$_3$)CH$_2$O)$_t$—C(O)NH—;

X is defined as above;

R$^6$ is selected from a —C$_1$ to C$_{30}$ linear or branched alkyl optionally comprising at least one unsaturated group, a hydroxy- or urethane-functional C$_1$ to C$_{30}$ linear or branched alkyl, a hydroxy- or urethane-functional linear or branched C$_1$ to C$_{30}$ polyether, a hydroxy- or urethane-functional linear or branched polyester having a polyester polymer backbone, a hydroxy- or urethane-functional linear or branched organosiloxane, an amine- or urea-functional linear or branched organosiloxane, a thiol- or thiocarbonate functional C$_1$ to C$_{30}$ linear or branched alkyl, an amine- or urea-functional C$_1$ to C$_{30}$ linear or branched alkyl,

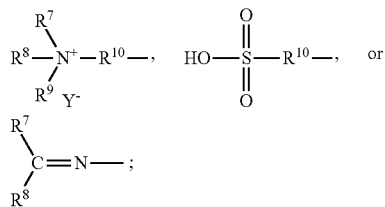

wherein

R$^7$, R$^8$, and R$^9$ are each independently, —H, —C$_1$ to C$_6$ alkyl, or combinations thereof;

R$^{10}$ is a divalent alkyl group of 1 to 20 carbons;

R$^{12}$ is —H or a monovalent C$_1$ to C$_6$ alkyl group;

R$^{15}$, R$^{16}$, and R$^{17}$ are each independently a —H; —C(O)NH—, —R$^{18}$; —C(O)R$^{18}$ provided that at least one R$^{15}$, R$^{16}$, or R$^{17}$ is a —C(O)NH—;

R$^{18}$ is independently a linear or branched alkyl group having 5 to 29 carbons optionally comprising at least 1 unsaturated bond;

z is 1 to 15;

Y is Cl;

s is an integer of 0 to 50;

t is an integer of 0 to 50; and s+t is greater than 0.

7. The method of claim 3 wherein X is selected from Formula (IIa) to be Formula (IIa'):

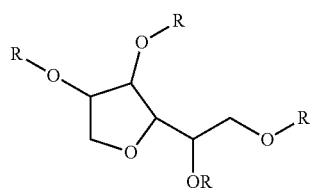

wherein R is further limited to independently a direct bond to NHC(O), —H; —R$^1$; or —C(O)R$^1$.

8. The method of claim 3 wherein X is selected from Formula (IIa) to be Formula (IIa'):

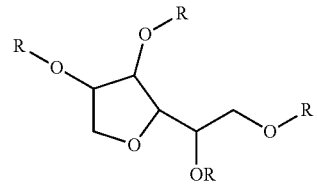

wherein R is further limited to independently a direct bond to
NHC(O), —H; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$.

9. The method of claim 1 wherein X is selected from Formula (IIb).

10. The method of claim 1 wherein X is selected from Formula (IIc).

11. The method of claim 6, wherein a linkage of Formula (IVa) is present, and D is —O—(CH$_2$CH$_2$O)$_s$(CH(CH$_3$)CH$_2$O)$_t$—C(O)NH—, or —[C(O)]—O—(CH$_2$CH$_2$O)$_s$(CH(CH$_3$)CH$_2$O)$_t$—C(O)NH—.

12. The method of claim 6, wherein a linkage of Formula (IVa) is present,

D is —N(R$^{12}$)—C(O)—NH—, —OC(O)NH—, —C(O)NH—, or —SC(O)NH—; and

R$^6$ is selected from a —C$_1$ to C$_{30}$ linear or branched alkyl optionally comprising at least one unsaturated group, a hydroxy- or urethane-functional C$_1$ to C$_{30}$ linear or branched alkyl, a hydroxy- or urethane-functional linear or branched C$_1$ to C$_{30}$ polyether, a hydroxy- or urethane-functional linear or branched polyester having a polyester polymer backbone, a hydroxy- or urethane-functional linear or branched organosiloxane, an amine- or urea-functional linear or branched organosiloxane, a thiol- or thiocarbonate functional C$_1$ to C$_{30}$ linear or branched alkyl, or an amine- or urea-functional C$_1$ to C$_{30}$ linear or branched alkyl.

13. The method of claim 6, wherein a linkage of Formula (IVb) is present.

14. The method of claim 1, where the coating base is selected from the group consisting of an acrylic polymer, epoxy polymer, vinyl polymer, and polyurethane polymer in the form of an interior house paint, exterior house paint, stain, or clear coating.

15. The method of claim 1, where the coating base is selected from the group consisting of a proppant particle treatment solution; treatment solution for concrete, brink tile, granite, limestone, marble, statuary, or mortar; floor finish; polishing agent; and floor polish.

16. The method of claim 1, where the surface effect is selected from decreased surface tension, resistance to blocking, oil repellency, water repellency, stain resistance, dirt pickup resistance, increased contact angle, or increased wetting and leveling of the coating surface.

17. The method of claim 1, where the substrate comprises proppant particles, unglazed concrete, brick, tile, granite, limestone, marble, grout, mortar, statuary, monuments, wood, composite materials, terrazzo, gypsum board, and wall and ceiling panels.

18. A coating composition made by the method of claim 1.

* * * * *